Patented Aug. 20, 1940

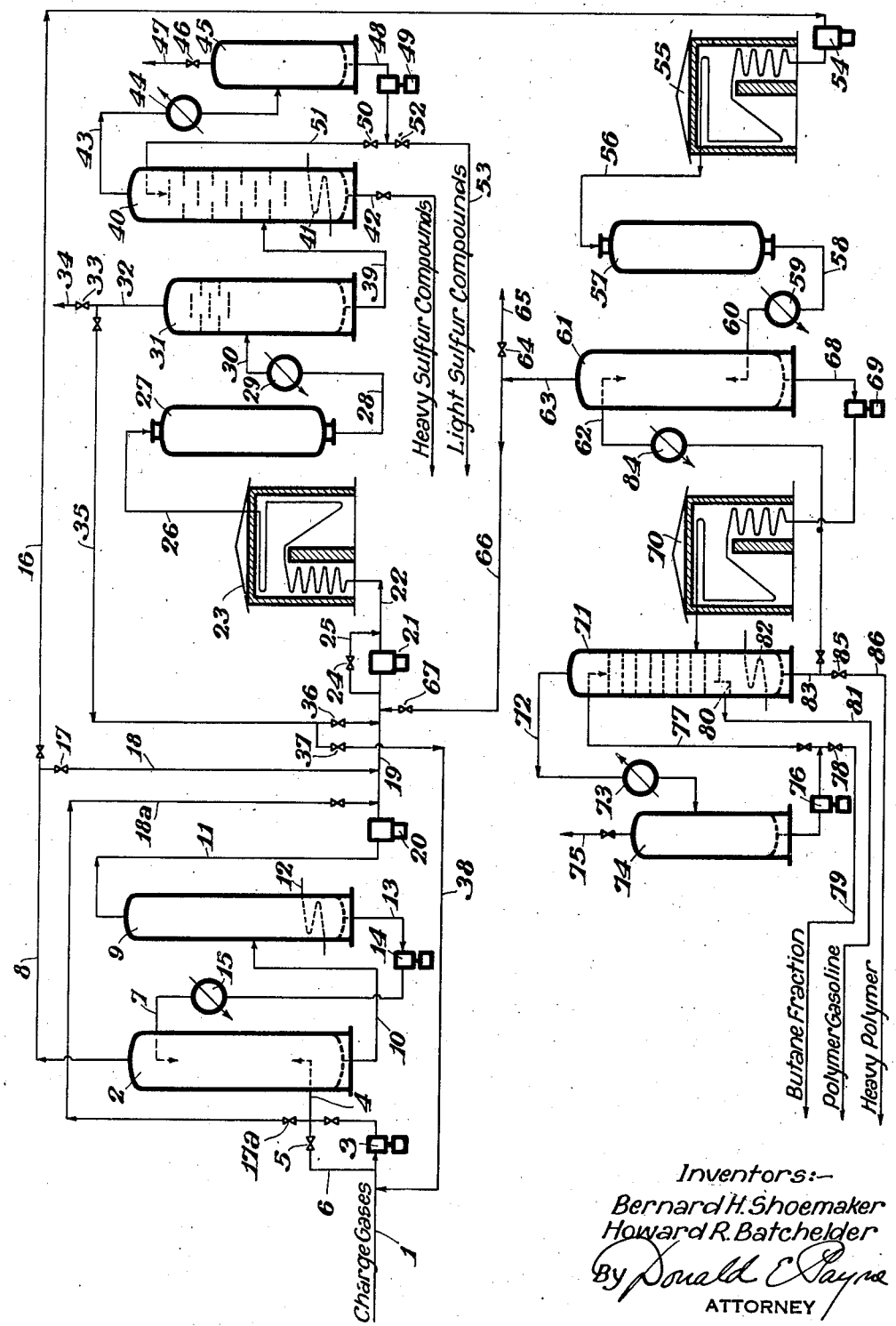

2,211,990

UNITED STATES PATENT OFFICE 2,211,990

PREPARATION OF ORGANIC SULPHUR COMPOUNDS

Bernard H. Shoemaker and Howard R. Batchelder, Hammond, Ind., assignors to Standard Oil Company, Chicago, Ill., a corporation of Indiana Application August 28, 1937, Serial No. 161,430

2 Claims. (Cl. 260—609)

This invention relates to the preparation of organic sulphur compounds. More specifically, it relates to improved processes for the treatment of hydrogen sulphide-containing olefinic hydrocarbon gases to produce organic sulphur compounds and hydrocarbon polymers suitable for use as motor fuel.

By means of the invention valuable organic sulphur compounds, such as alkyl mercaptans and thioethers, are prepared from the hydrogen sulphide contained in gases to be polymerized and a polymer is obtained which is low in sulphur, and easily treated by conventional methods to produce finished motor fuel meeting all specifications.

It is an object of the invention to provide a process for removing hydrogen sulphide from olefinic gas to be polymerized and producing organic sulphur compounds therefrom. Another object is to provide a process for utilizing the hydrogen sulphide and a portion of the olefins in a hydrogen sulphide-containing olefinic gas to produce organic sulphur compounds. Another object is to provide a unitary process for producing organic sulphur compounds and a hydrocarbon polymer suitable for use as motor fuel from a hydrogen sulphide-containing olefinic gas. Further objects will be apparent from the following detailed description read in connection with the drawing, in which one form of apparatus for carrying out the invention is diagrammatically represented.

In the polymerization of olefinic gases to produce motor fuels, the gases to be polymerized usually contain hydrogen sulphide, often in such large quantities that the polymer produced is so high in sulphur that it is extremely difficult to refine so as to meet specifications for maximum sulphur content. The invention comprises the separation of a major portion of the hydrogen sulphide from such gases prior to the polymerization thereof, the admixture of a portion of the gases, either before or after hydrogen sulphide removal, with the separated hydrogen sulphide, and the catalytic treatment of the mixture at an elevated temperature and pressure to produce organic sulphur compounds such as mercaptans and thioethers. The polymerization unit used in accordance with the invention may be of either the catalytic or the thermal type. The portion of the gases mixed with the hydrogen sulphide may be obtained directly from the gas stream being charged to the process or from that leaving the desulphurizing stage, or it may be a portion of the gases leaving the polymerization stage, especially if the polymerization unit is of the catalytic type. The reaction between the olefins and the hydrogen sulphide is preferably carried out at a pressure in the range of 100 to 500 pounds per square inch and at a temperature between 350 and 600° F., although somewhat higher temperatures may be employed. The catalyst used for this reaction is preferably phosphoric acid on kieselguhr or other catalyst support, but other catalysts such as the sulphides of metals of groups 2 to 8 inclusive, phosphorus trisulphide or pentasulphide, aluminum, chromium or thorium oxide, and active clay or charcoal may be used. Examples of suitable metal sulphide catalysts are CdS, ZnS, FeS, CuS and MoS. If desired, a mixture of these catalysts may be employed.

The organic sulphur compounds produced by the process of the invention are principally alkyl mercaptans and thioethers, the reactions occurring being represented by the following equations, in which R represents either a hydrogen atom or an alkyl group:

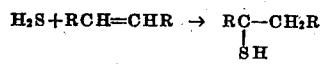

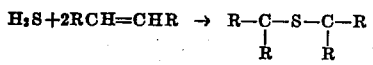

Although the equations given show the production of branched chain compounds, straight chain compounds may be formed in smaller amounts together with by-products. When it is desired to produce a product consisting largely of mercaptans the ratio of olefin to hydrogen sulphide in the reaction mixture is controlled so that from 1 to 3 mols of hydrogen sulphide are present for each mol of olefin. If it is desired to produce principally thioethers the reaction mixture contains from 2 to 10 mols of olefin per mol of hydrogen sulphide.

In one specific embodiment of the invention which is illustrated by the drawing, a hydrogen sulphide-containing olefinic gas is introduced into the system by means of line 1. This gas may be obtained from any suitable source, for example from the cracking of crude oils or petroleum distillates which are high in sulphur, and preferably contains at least 100 grains of hydrogen sulphide per 100 cubic feet, and at least 10% by volume of gaseous olefins, such as ethylene, propylene and butylene. The gas is then introduced into the bottom of the absorption tower 2 by means of pump or compressor 3 and line 4. If the gas is already at a sufficiently high pressure the gas may be by-passed around pump 3 by opening valve 5 in line 6. The gas passes up absorption tower 2 countercurrent to a liquid medium capable of absorbing hydrogen sulphide, such as sodium phenolate, triethanolamine, etc., which is introduced into the top of tower 2 by means of line 7. Tower 2 may be operated at any suitable pressure, but preferably at a relatively high pressure such as 225 pounds per square inch. The gas, from which 85 to 98% of its hydrogen sulphide content has been removed, is withdrawn from tower 2 by means of line 8. The absorption medium containing hydrogen sulphide is removed from the bottom of tower 2 and introduced into the hydrogen sulphide still 9 by means of line 10. In still 9 the pressure is maintained at a relatively low value, for example 5 pounds per square inch gage, and the hydrogen sulphide evolved is withdrawn from the top of still 9 by means of line 11. A steam coil or other suitable heating means 12 is located in the bottom of still 9 in order to insure the complete removal of hydrogen sulphide from the absorption medium, which is then removed from the bottom of still 9 through line 13 and passed through pump 14, cooler 15 and line 7 into the top of tower 2.

The desulphurized gas in line 8 is passed directly to the polymerization stage by means of line 16 but a portion thereof may be diverted through valve 17 in line 18 and combined in the proper proportion in line 19 with the hydrogen sulphide from line 11, which has been raised to the proper pressure by means of pump or compressor 20. Alternatively valve 17 may be closed, and charge gases, which contain olefins and hydrogen sulphide, may be supplied to line 19 through valve 17a and line 18a. If desired some gas from each source may be used. The amount of gas admitted through valve 17 and/or valve 17a is preferably regulated so that the mol ratio of olefins to hydrogen sulphide in the mixture is between 1 to 1 and 1 to 3 if mercaptans are desired as the principal product, or between 2 to 1 and 10 to 1 if thioethers are desired as the principal product as hereinbefore stated, although intermediate proportions may be used.

The resulting mixture of olefinic gas and hydrogen sulphide in line 19 is then passed through pump or compressor 21, which raises the pressure thereof to 100 to 500 pounds per square inch, and and through line 22 to heater 23, in which the temperature is raised to 350 to 600° F. If the pressure of the reaction mixture in line 19 is already sufficiently high, pump or compressor 21 may be by-passed by opening valve 24 in line 25. The heated reaction mixture from heater 23 is then introduced by means of line 26 into catalyst chamber 27, which contains a catalyst which favors the reaction of olefins and hydrogen sulphide, as hereinabove described. The reaction products are withdrawn from the bottom of catalyst chamber 27 by means of line 28, passed through condenser 29 and line 30, and introduced into separator 31, from which unreacted hydrogen sulphide and other light gases are removed by means of line 32.

The separator 31 is preferably operated at such temperature and pressure that the gas mixture in line 32 contains unreacted hydrogen sulphide and light hydro-carbon, but substantially no components boiling above propane. This mixture may be removed from the system through valve 33 and line 34, or it may be recycled by means of line 35 and valve 36, and combined with the reaction mixture in line 19. The latter method of operation is preferred when the reaction is carried out using a substantial excess of hydrogen sulphide. An alternative procedure is to close valve 36 and open valve 37, and pass the hydrogen sulphide-containing gas in line 32 through lines 35 and 38 to line 1, in which it is mixed with the incoming gases being charged to the process. In this way the hydrogen sulphide therein is recovered for use in the synthesis of sulphur compounds, and the light saturated hydrocarbons are prevented from accumulating in the system. It is apparent that combinations of these methods of handling the gas in line 32 may be used if desired.

The liquid reaction products containing organic sulphur compounds and some propane and heavier hydrocarbons are removed from the bottom of separator 31 by means of line 39 and introduced into fractionator 40 which is provided with a heating coil 41 to provide heat for the fractionation. In fractionator 40 the sulphur compounds are separated into a heavy fraction, which is removed from the bottom of the tower by means of line 42 and a light fraction, which is removed overhead through line 43, condensed in condenser 44, and introduced into separator 45. Uncondensed gases are removed from the system through valve 46 and line 47, and the condensed light sulphur compounds are withdrawn from separator 45 through line 48 and pump 49, a portion of the latter being circulated to the top of fractionator 40 as a reflux by means of valve 50 and line 51, while the remainder is removed as product through valve 52 and line 53. Because thioethers are considerably higher in boiling point than the corresponding mercaptans it is possible to separate the reaction products in fractionator 40 so that the heavy product withdrawn through line 42 will be predominantly thioethers, while that withdrawn through line 53 will be predominantly mercaptans. Unreacted and/or saturated hydrocarbons may, of course, be present in both of these fractions, which may be further purified and fractionated to produce substantially pure sulphur compounds. Separation into other fractions may be readily accomplished using the apparatus shown. For example, when the system is operated to produce predominantly mercaptans, the heavy fraction may be largely butyl mercaptan, while the light fraction comprises essentially ethyl and propyl mercaptans.

The desulphurized olefinic gas in line 16 is charged to the polymerization stage by means of pump or compressor 54 and passed through heater 55, wherein the temperature is raised to the desired reaction temperature. The heated gas is then introduced by means of line 56 into reaction chamber 57. Although the polymerization step may be of the thermal type, preferably the catalytic type of polymerization is employed. In this case the reaction chamber 57 is filled with a polymerization catalyst, such as phosphoric acid supported on kieselguhr or similar material, or a substance of the aluminum halide stable double salt type such as sodium chloroaluminate, and the pressure is maintained at 200 to 1000 pounds per square inch and the temperature at 200 to 550° F. Preferably the catalyst chamber is operated at pressures ranging from 275 to 400 pounds per square inch and at temperatures of 300 to 500° F. If a catalyst is not employed, temperatures of 1000 to 1200° F. and pressures of 500 to 2000 pounds per square inch are suitable.

The polymerized products are removed from the bottom of reaction chamber 57 through line 58, cooled by means of cooler 59 and passed by means of line 60 into the lower portion of absorber 61, in which the gases rise countercurrent to a stream of absorber oil introduced into the upper portion of absorber 61 by means of line 62. Constituents unabsorbed in absorber 61 are removed from the upper portion thereof by means of line 63, and are either withdrawn from the system through valve 64 and line 65 or recycled through line 66 and valve 67 to line 19, which contains a mixture of olefins and hydrogen sulphide as hereinabove described. The rich absorber oil containing the polymerized product is removed from the bottom of absorber 61 by means of line 68 and is pumped through heater 70 to stabilizer 71 by means of pump 69. The conditions in stabilizer 71 are so maintained that light products such as butane which are unsuitable in large amounts in motor fuel are removed from the top thereof by means of line 72 and passed through cooler 73 to stabilizer reflux drum 74, from which the uncondensed gases are vented from the system through line 75. A portion of the butane fraction in stabilizer reflux drum 74 is returned to the upper portion of stabilizer 71 by means of pump 76 and line 77, while the remaining portion is withdrawn from the system through valve 78 and line 79. The lower portion of stabilizer 71 is provided with a draw-off plate 80 from which polymer is removed by means of line 81. This polymer is low in sulphur and may easily be refined to finished motor fuel, for example by sweetening and rerunning in the usual manner. The portion of stabilizer 71 below draw-off plate 80 is provided with a heating coil 82 which causes the vaporization of the gasoline constituents in the polymer in the bottom of the tower. This heavy polymer is withdrawn through line 83, cooled in cooler 84 and returned to the top of absorber 61 through line 62 for use as absorber oil as hereinabove described. The excess heavy polymer is withdrawn from the system through valve 85 and line 86.

In a modification of the invention all of the desulphurized gas in line 8 is sent to the polymerization stage by means of line 16 and valves 17 and 17a are maintained in a closed position. The gas is catalytically polymerized as hereinabove described, using a catalyst such as phosphoric acid on kieselguhr which selectively polymerizes propylene, butylene and higher olefins but has substantially no effect upon ethylene. The unabsorbed gas in line 63 contains a large quantity of ethylene and relatively little propylene and butylene, and this gas is then passed by means of line 66 and valve 67 into line 19, in which it is mixed in the proper proportion with hydrogen sulphide from line 11. The synthesis of organic sulphur compounds from the resulting mixture of hydrogen sulphide and ethylene-containing gas is carried out as hereinabove described, but the product in this case will consist primarily of ethyl mercaptan and/or ethyl thioether. It is apparent, however, that a portion of the olefinic gas to be mixed with hydrogen sulphide may be supplied through valves 17 and/or 17a, thus yielding a mixture of ethyl and heavier mercaptans and/or thioethers.

While we have described in detail certain specific embodiments of our invention, we do not limit ourselves thereto except as defined by the following claims which should be construed as broadly as the prior art will permit.

We claim:

1. The process of preparing organic sulphur compounds from a gas containing substantial amounts of ethylene, higher homologs of ethylene and hydrogen sulphide which comprises removing hydrogen sulphide from said gas, polymerizing said desulphurized gas in the presence of a catalyst to produce a normally liquid polymer, separating unreacted gas containing ethlene from said polymer, and reacting at least a portion of the ethylene in said unreacted gas with said hydrogen sulphide in the presence of a catalyst comprising phosphoric acid on kieselguhr at a temperature in the range from about 350° F. to about 600° F. and a pressure of about 100 to 500 pounds per square inch to produce organic sulphur compounds.

2. The process of preparing organic sulphur compounds from a gas containing substantial amounts of ethylene, higher homologs of ethylene and hydrogen sulphide which comprises removing hydrogen sulphide from said gas, polymerizing said desulphurized gas in the presence of a catalyst comprising phosphoric acid on kieselguhr at a temperature in the range from about 200° F. to about 550° F. and a pressure of about 200 to 1000 pounds per square inch to produce a normally liquid polymer, separating unreacted gas containing ethylene from said polymer, and reacting at least a portion of the ethylene in said unreacted gas with said hydrogen sulphide in the presence of a catalyst comprising phosphoric acid on kieselguhr at a temperature in the range from about 350° F. to about 600° F. and a pressure of about 100 to 500 pounds per square inch to produce organic sulphur compounds.

BERNARD H. SHOEMAKER.
HOWARD R. BATCHELDER.